(12) United States Patent
Kim et al.

(10) Patent No.: US 12,308,497 B2
(45) Date of Patent: May 20, 2025

(54) METHOD OF MANUFACTURING MEMBRANE-ELECTRODE ASSEMBLY BY DIRECTLY COATING ELECTRODE LAYER ON ELECTROLYTE MEMBRANE

(71) Applicants: HYUNDAI MOTOR COMPANY, Seoul (KR); KIA CORPORATION, Seoul (KR)

(72) Inventors: Yong Min Kim, Seoul (KR); Jun Woo Kim, Suwon-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 655 days.

(21) Appl. No.: 17/380,575

(22) Filed: Jul. 20, 2021

(65) Prior Publication Data

US 2022/0069325 A1 Mar. 3, 2022

(30) Foreign Application Priority Data

Aug. 25, 2020 (KR) .................. 10-2020-0107158

(51) Int. Cl.
*H01M 8/1004* (2016.01)
*B32B 43/00* (2006.01)
(Continued)

(52) U.S. Cl.
CPC ......... *H01M 8/1004* (2013.01); *B32B 43/006* (2013.01); *H01M 8/106* (2013.01);
(Continued)

(58) Field of Classification Search
CPC ......... H01M 2008/1095; H01M 4/881; H01M 8/1004; H01M 8/1039; H01M 8/106;
(Continued)

(56) References Cited

U.S. PATENT DOCUMENTS

| | | | | |
|---|---|---|---|---|
| 2007/0077350 A1* | 4/2007 | Hohenthanner | ...... | H01M 8/103 429/492 |
| 2012/0279648 A1* | 11/2012 | Hou | ...... | H01M 4/886 156/280 |
| 2015/0064599 A1* | 3/2015 | Brauninger | ...... | H01M 8/1067 429/480 |

FOREIGN PATENT DOCUMENTS

| | | |
|---|---|---|
| CN | 108713269 A | 10/2018 |
| KR | 10-2017-0019171 A | 2/2017 |
| KR | 10-2018-0070945 A | 6/2018 |

OTHER PUBLICATIONS

A. Kusoglu, et al., "New Insights into Perfluorinated Sulfonic-Acid Ionomers," ACS Publications, American Chemical Society, 2017, pp. 987-1104.

(Continued)

*Primary Examiner* — Philip C Tucker
*Assistant Examiner* — Jimmy R Smith, Jr.
(74) *Attorney, Agent, or Firm* — Morgan Lewis & Bockius LLP (57) ABSTRACT

A method of manufacturing a membrane-electrode assembly includes: forming an electrolyte membrane containing an ionomer on a base material; applying an electrode slurry containing a catalyst, a binder, and a solvent to a first surface of the electrolyte membrane to form a structure including the electrolyte membrane and an electrode layer laminated on the first surface of the electrolyte membrane; and delaminating the structure from the base material.

7 Claims, 6 Drawing Sheets

(51) Int. Cl.
*H01M 4/88* (2006.01)
*H01M 8/10* (2016.01)
*H01M 8/106* (2016.01)
*H01M 8/1097* (2016.01)

(52) U.S. Cl.
CPC ........ *H01M 8/1097* (2013.01); *H01M 4/8882* (2013.01); *H01M 2008/1095* (2013.01)

(58) Field of Classification Search
CPC ... H01M 8/1067; H01M 8/1097; Y02E 60/50; Y02P 70/50; B32B 43/006
See application file for complete search history.

(56) References Cited

OTHER PUBLICATIONS

In-Su Park, et al., "Fabrication of catalyst-coated membrane-electrode assemblies by doctor blade method and their performance in fuel cells," Journal of Power Sources, vol. 195, 2010, pp. 7078-7082.

* cited by examiner

METHOD OF MANUFACTURING MEMBRANE-ELECTRODE ASSEMBLY BY DIRECTLY COATING ELECTRODE LAYER ON ELECTROLYTE MEMBRANE

CROSS-REFERENCE TO RELATED APPLICATION

This application claims the benefit of priority to Korean Patent Application No. 10-2020-0107158 filed on Aug. 25, 2020 in the Korean Intellectual Property Office, the entire contents of which are incorporated herein by reference.

TECHNICAL FIELD

The present disclosure relates to a method of manufacturing a membrane-electrode assembly in which wrinkles and/or cracks are not generated even when an electrode layer is directly coated on an electrolyte membrane.

BACKGROUND

A membrane-electrode assembly (MEA) is typically manufactured through a decal method or a direct coating method.

The decal method is a method of coating and drying an electrode slurry in which a catalyst, a binder, and a solvent are mixed on a release paper such as Teflon, an imide film, or the like, generating an electrode layer (an anode and a cathode), arranging the electrode layer on both sides of an electrolyte membrane, applying heat and pressure to the electrode layer, and then transferring the electrode layer on the both sides of the electrolyte membrane.

The decal method requires additional components such as the release paper. In addition, since the electrode layer is not completely transferred, there occurs a case in which expensive catalysts, such as platinum and the like, an ionomer, and the like, which are included in the electrode layer, are discarded.

The direct coating method is a method of manufacturing an MEA by spraying or directly applying an electrode slurry to an electrolyte membrane using an air brush or the like.

The direct coating method has an advantage of being simpler than the decal method. In addition, since there is no need for a release paper for the electrode layer, and the electrode slurry is used as much as needed, it is advantageous in terms of cost.

Figure 1:
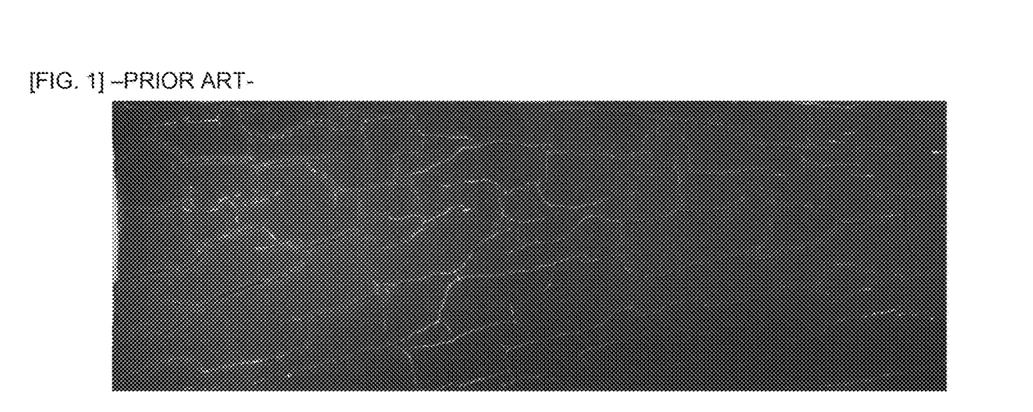
FIG. 1 is a photograph showing an electrode layer which is formed by directly coating the electrode layer on an electrolyte membrane through a conventional method.

However, since the direct coating method is to directly spray or apply the electrode slurry to the electrolyte membrane, the electrolyte membrane is expanded due to a solvent contained in the electrode slurry, and a dimensional change occurs as the expanded electrolyte membrane is contracted during a drying process. Consequently, as shown in FIG. 1, cracks are severely generated in the electrode layer.

In order to suppress the above dimensional change of the electrolyte membrane, various attempts are being carried out.

First, in a related art, a solvent which is not easily evaporated due to a high boiling point is absorbed in the electrolyte membrane and thus expansion and contraction due to an organic solvent contained in the electrode slurry are suppressed. However, since the solvent having a high boiling point is used, it is difficult to dry and the solvent remains after drying so that there is a problem in that performance of an MEA is degraded.

Next, there is a technique of rapidly drying the solvent before the electrolyte membrane absorbs the solvent contained in the electrode slurry. However, there is a problem in that, as the solvent changes from liquid to gas due to rapid drying, patterns in the form of bubbles are generated such that a surface state of the electrode layer is not uniform.

In addition, after preparing the electrode slurry by increasing a ratio of an aqueous solvent, a method of coating the electrode slurry to the electrolyte membrane has also be attempted. However, a drying time is increased due to a high boiling point of the aqueous solvent and viscosity of the electrode slurry is increased so that there is a problem in that a shape of the electrode is not properly formed.

The information included in this Background section is only for enhancement of understanding of the general background of the present disclosure and may not be taken as an acknowledgement or any form of suggestion that this information forms the prior art already known to a person skilled in the art.

SUMMARY OF THE DISCLOSURE

The present disclosure has been made in an effort to solve the above-described problems associated with prior art.

In one aspect, the present disclosure provides a method of manufacturing a membrane-electrode assembly (MEA) through a direct coating method, which is capable of suppressing a dimensional change of an electrolyte membrane as much as possible.

Objectives of the present disclosure are not limited to the above-described objectives, and other objectives of the present disclosure, which are not mentioned, can be understood by the following description and also will be apparently understood through embodiments of the present disclosure. Further, the objectives of the present disclosure can be implemented by means described in the appended claims and a combination thereof.

In an exemplary embodiment, the present disclosure provides a method of manufacturing a membrane-electrode assembly (MEA), which includes forming an electrolyte membrane containing an ionomer on a base material; applying an electrode slurry containing a catalyst, a binder, and a solvent to a first surface of the electrolyte membrane to form a structure including the electrolyte membrane and an electrode layer laminated on the first surface of the electrolyte membrane; and delaminating the structure from the base material.

The base material may include at least one release paper selected from the group consisting of polyimide (PI), polyethylene terephthalate (PET), polyethylene naphthalate (PEN), polytetrafluoroethylene (PTFE), and a combination thereof.

The ionomer may contain a perfluorinated sulfonic acid-based polymer expressed by Formula 1 below;

[Formula 1]

wherein, m ranges from 2.2 to 4.7, n ranges from 2 to 4, x ranges from 0 to 1, and y ranges from 2 to 4.

The ionomer may have an equivalent weight (EW) of 700 g/mol or more.

When the ionomer is an ionomer of Formula 1, wherein m is 3; n is 1; x is 1, and y is, delamination strength between the base material and the electrolyte membrane may be greater than or equal to 0.28 gf/mm.

When the ionomer is an ionomer of Formula 1, wherein m is 3.6; n is 1; x is 0; and y is, delamination strength between the base material and the electrolyte membrane may be greater than or equal to 0.84 gf/mm.

When the ionomer is an ionomer of Formula 1, wherein m is 4.2; n is 1; x is 0; and y is, delamination strength between the base material and the electrolyte membrane may be greater than or equal to 7.32 gf/mm.

The manufacturing method may further include, after the forming of the electrolyte membrane on the base material, performing heat treatment on the resultant and adjusting delamination strength between the base material and the electrolyte membrane.

The heat treatment may be performed in a condition in which a temperature ranges from 100° C. to 160° C.

The electrolyte membrane may include a reinforcement layer and an ion transport layer provided on at least one surface of the reinforcement layer, and the ion transport layer may contain an ionomer.

The solvent may include a mixture in which an aqueous solvent is mixed with an organic solvent in a mass ratio ranging from 5:5 to 9:1.

The manufacturing method may include that the electrode slurry is applied and then dried to manufacture the structure.

An area of the electrode layer may be smaller than an area of the electrolyte membrane.

The manufacturing method may include that, in a condition in which a temperature ranges from 30° C. to 100° C. and relative humidity (RH) ranges from 50% to 100%, the structure is exposed for three seconds or more and delaminated from the base material.

The manufacturing method may further include forming an electrode layer on a second surface of the electrolyte membrane included in the delaminated structure and obtaining an MEA.

The manufacturing method may further include performing heat treatment on the MEA.

Other aspects and embodiments of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

The above and other objectives, features, and advantages of the present disclosure will become more apparent from the following description of exemplary embodiments with reference to the accompanying drawings. However, the present disclosure is not limited to the embodiments disclosed herein and may be implemented in other forms. The embodiments disclosed herein will be provided to make this disclosure thorough and complete, and will fully convey the spirit of the present disclosure to those skilled in the art.

In describing each drawing, similar reference numerals are assigned similar components. In the accompanying drawings, dimensions of structures are shown in an enlarged scale for clarity of the present disclosure. Although the terms "first," "second," and the like may be used herein to describe various components, these components should not be limited to these terms. The terms are used only for the purpose of distinguishing one component from another component. For example, without departing from the scope of the present disclosure, a first component may be referred to as a second component, and similarly, a second component may also be referred to as a first component. Unless the context clearly dictates otherwise, the singular form includes the plural form.

It should be understood that the terms "comprise," "include," and "have" specify the presence of stated herein features, numbers, steps, operations, components, elements, or combinations thereof, but do not preclude the presence or possibility of adding one or more other features, numbers, steps, operations, components, elements, or combinations thereof. Further, when a portion of a layer, a film, a region, a plate, or the like is referred to as being "on" other portion, this includes not only a case in which the portion is "directly on" the other portion but also a case in which another portion is present between the portion and the other portion. Contrarily, when a portion of a layer, a film, a region, a plate, or the like is referred to as being "under" other portion, this includes not only a case in which the portion is "directly under" the other portion but also a case in which another portion is present between the portion and the other portion.

Unless otherwise specified, all numbers, values, and/or expressions indicating ingredients, reaction conditions, polymer compositions, and quantities of combination products used herein are approximations to which various uncertainties of measurement are reflected, wherein the various uncertainties occur in obtaining these values among essentially different other things so that it should be understood that all numbers, values, and/or expressions are modified by a term "about." In addition, when a numerical range is disclosed herein, such a numerical range is continuous and, unless otherwise indicated, the numerical range includes all values from a minimum value to a maximum value. Further, when the numerical range refers to integers, unless otherwise indicated, all integers from a minimum value to a maximum value are included.

Figure 2:
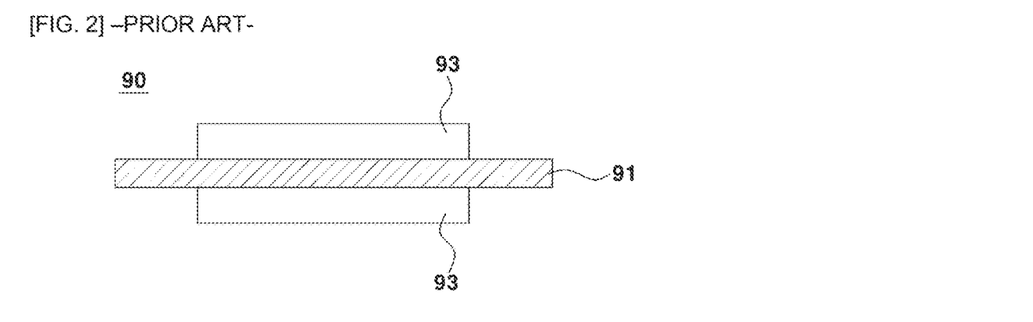
FIG. 2 is a schematic diagram illustrating a typical membrane-electrode assembly (MEA)

FIG. 2 is a schematic diagram illustrating a typical membrane-electrode assembly (MEA) 90. The MEA 90 includes an electrolyte membrane 91 and electrode layers 93 formed on both sides of the electrolyte membrane 91.

The electrolyte membrane 91 is made of an ionomer, and the ionomer contains a perfluorinated sulfonic acid-based polymer. The perfluorinated sulfonic acid-based polymer contains an extremely hydrophilic ionic group such as sulfonic acid at an end of a side chain. Therefore, the perfluorinated sulfonic acid-based polymer has extremely hydrophilicity at the end of the side chain and extremely hydrophobicity at the remaining portions. That is, when the ionomer encounters a hydrophobic or hydrophilic material to interact therewith, dimensional changes such as dissolution and expansion are caused.

Figure 3:
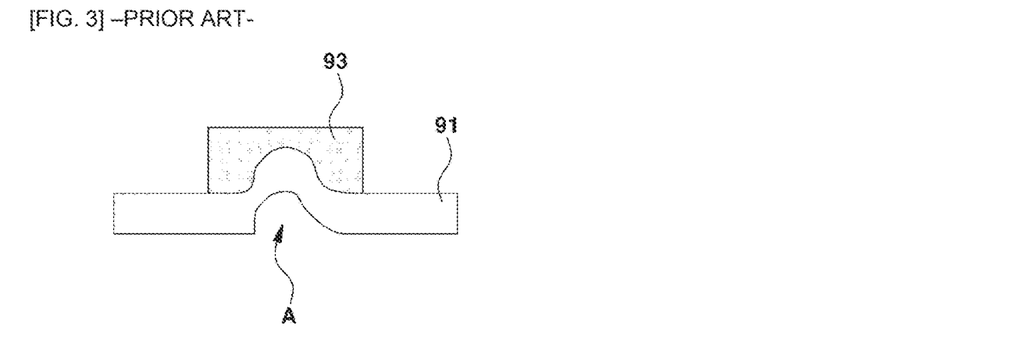
FIG. 3 is a reference diagram for describing generation of wrinkles in the electrolyte membrane when the electrode layer is directly coated on the electrolyte membrane through the conventional method.

The electrode layer 93 is manufactured using an electrode slurry. The electrode slurry may be obtained by dispersing an electrode material such as a catalyst, a binder, and the like in a solvent. In order to disperse the electrode material in a solvent, an aqueous solvent such as water and an organic solvent such as alcohol should be mixed and used. Thus, when the electrode slurry is directly sprayed or applied to the electrolyte membrane 91, the ionomer of the electrolyte membrane 91 absorbs the solvent, specifically, the organic solvent and expands, and as shown in FIG. 3, a wrinkle A is formed on the electrolyte membrane 91. In this state, when the electrolyte membrane 91 and the electrode layer 93 are dried, the expanded electrolyte membrane 91 is contracted so that cracks are severely generated in the electrode layer 93 as described with reference to FIG. 1.

The present disclosure is to prevent the above problems from occurring and is characterized in that an electrolyte membrane containing an ionomer is formed on a base material, delamination strength between the base material and the electrolyte membrane is adjusted to be a predetermined level or more, and then an electrode layer is formed on an electrolyte membrane.

Figure 4:
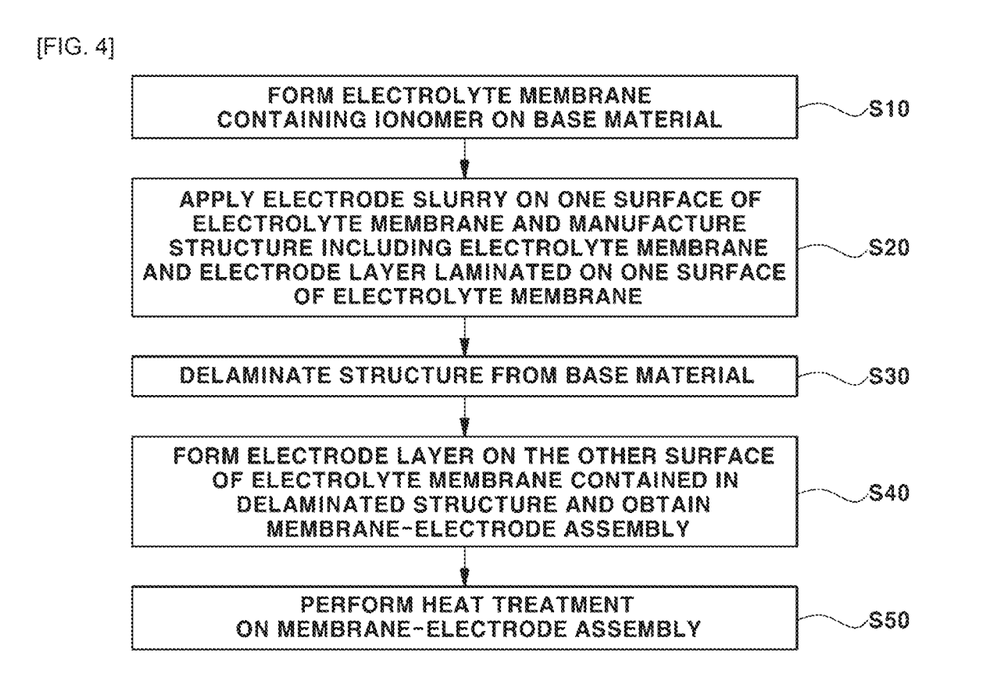
FIG. 4 is a flowchart illustrating a method of manufacturing an MEA according to an exemplary embodiment of the present disclosure.

FIG. 4 is a flowchart illustrating a method of manufacturing an MEA according to an exemplary embodiment of the present disclosure. Referring to FIG. 4, the manufacturing method may include forming an electrolyte membrane containing an ionomer on a base material (S10), applying an electrode slurry containing a catalyst, a binder, and a solvent on one surface of the electrolyte membrane and manufacturing a structure including an electrolyte membrane and an electrode layer laminated on the one surface of the electrolyte membrane (S20), delaminating the structure from the base material (S30), forming an electrode layer on the other surface of the electrolyte membrane contained in the delaminated structure and obtaining an MEA (S40), and performing heat treatment on the MEA (S50).

Figure 5:
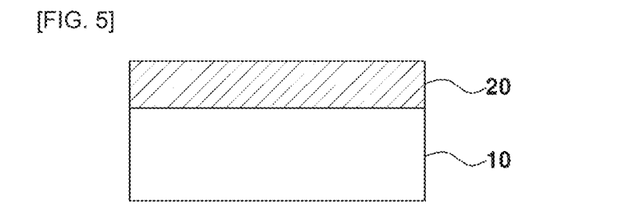
FIG. 5 is a diagram illustrating a state in which an electrolyte membrane is formed on a base material according to an exemplary embodiment of the present disclosure.

First, as shown in FIG. 5, an electrolyte membrane 20 containing an ionomer may be formed on a base material 10 (S10).

The base material 10 may include at least one release paper selected from the group consisting of polyimide (PI), polyethylene terephthalate (PET), polyethylene naphthalate (PEN), polytetrafluoroethylene (PTFE), and a combination thereof.

The base material 10 may be attached to the electrolyte membrane 20 through a release agent. The release agent is not particularly limited and may include, for example, a PVC-based release agent.

The electrolyte membrane 20 may be formed to a predetermined thickness by applying the ionomer on the base material 10. A method of applying the ionomer is not particularly limited, and the ionomer may be applied using, for example, a bar coater, a squeegee, a blade, or the like.

The ionomer may contain a perfluorinated sulfonic acid-based polymer expressed by Formula 1 below.

[Formula 1]

wherein m ranges from 2.2 to 4.7, n ranges from 2 to 4, x ranges from 0 to 1, and y ranges from 2 to 4.

The present disclosure is characterized in that, when the electrode layer is directly formed on the electrolyte membrane 20 by adjusting delamination strength between the base material 10 and the electrolyte membrane 20 to an appropriate level, a dimension of the electrolyte membrane 20 is not drastically changed.

The delamination strength between the base material 10 and the electrolyte membrane 20 may be appropriately adjusted according to an equivalent weight (EW) of the ionomer and a length of a side chain of the ionomer.

Specifically, the ionomer may have an EW of 700 g/mol or more. When the EW of the ionomer should be 700 g/mol or more, a moisture content of the ionomer is lowered and thus the dimensional change becomes smaller.

When the ionomer is a long side chain ionomer of Formula 1 wherein x is 1; y is, the delamination strength between the base material 10 and the electrolyte membrane 20 may be greater than or equal to 0.28 gf/mm.

In addition, when the ionomer is a medium side chain ionomer of Formula 1 wherein x is 1; y is 4, the delamination strength between the base material 10 and the electrolyte membrane 20 may be greater than or equal to 0.84 gf/mm.

In addition, when the ionomer is a short side chain ionomer of Formula 1 wherein x is 1; y is, the delamination strength between the base material 10 and the electrolyte membrane 20 may be greater than or equal to 7.32 gf/mm.

Since an amount of an absorbed solvent is varied according to the length of the side chain of the ionomer, it is important to appropriately adjust the delamination strength according to each case.

Here, the "delamination strength" is a value which is measured according to an ASTM D903.98 standard. Specifically, a sample having a width of 25 mm was collected, and a force when the electrolyte membrane was delaminated from the release paper was measured in a condition in which a temperature is 23° C. and a relative humidity is 50% using a universal testing machine (UTM).

In each case, an upper limit value of the delamination strength is not particularly limited. Later, in order to easily separate the electrolyte membrane 20 from the base material 10, the delamination strength may be adjusted to be less than or equal to 10 gf/mm.

When an appropriate level of the delamination strength is not satisfied according to a kind of ionomer and the electrode layer is formed on the electrolyte membrane 20, the electrolyte membrane 20 may be expanded due to the solvent of the electrode slurry so that wrinkles may be generated.

The electrolyte membrane 20 is formed on the base material 10 and then the resultant is heat-treated so that the delamination strength between the base material and the electrolyte membrane 20 may be adjusted. A condition of the heat treatment is not particularly limited, and the heat treatment may be performed in a condition, for example, in which a temperature ranges from 100° C. to 160° C.

Figure 6:
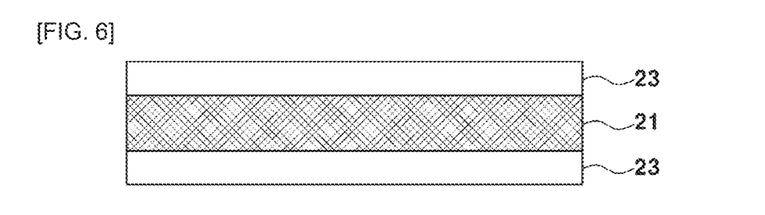
FIG. 6 is a diagram illustrating an electrolyte membrane according to another exemplary embodiment of the present disclosure.

The electrolyte membrane 20 may be a single layer made of the ionomer, or, as shown in FIG. 6, the electrolyte membrane 20 may include a reinforcement layer 21 and an ion transport layer 23 provided on at least one surface of the reinforcement layer 21 and made of the ionomer.

The reinforcement layer 21 is a component for increasing mechanical rigidity of the electrolyte membrane 20. The reinforcement layer 21 may include at least one selected from the group consisting of PTFE, expanded polytetrafluoroethylene (e-PTFE), polyethylene (PE), polypropylene (PP), polyphenylene oxide (PPO), polybenzimidazole (PBI), PI, polyvinylidene fluoride (PVdF), polyvinyl chloride (PVC), and a combination thereof.

In addition, the reinforcement layer 21 may be a porous membrane having lots of pores. The reinforcement layer 21 may be impregnated with the ionomer.

When the electrolyte membrane 20 includes the reinforcement layer 21, the electrolyte membrane 20 as shown in FIG. 6 may be formed first, and then the electrolyte membrane 20 may be bonded to the base material 10. A method of bonding the electrolyte membrane 20 is not particularly limited, and for example, the electrolyte membrane 20 may be directly bonded or transferred.

Figure 7:
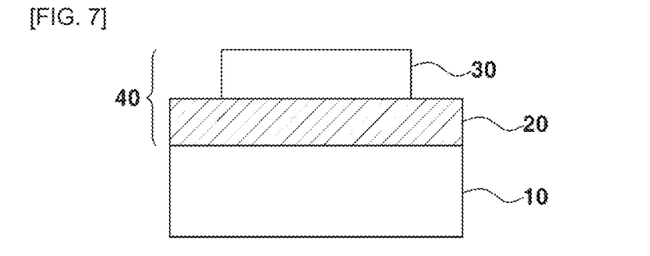
FIG. 7 is a diagram illustrating a state in which an electrode layer is formed on the electrolyte membrane according to the present disclosure.

Thereafter, as shown in FIG. 7, an electrode slurry may be applied on the electrolyte membrane 20 to manufacture a structure 40 including the electrolyte membrane 20 and an electrode layer 30 laminated on one surface of the electrolyte membrane 20 (S20).

The electrode slurry may include a catalyst, a binder, and a solvent.

The catalyst may be a catalyst in which a catalyst metal is deposited on a support.

The support is not particularly limited and may be a carbon support or the like.

The carbon support may include at least one selected from the group consisting of graphite, carbon black, activated carbon, carbon nanotubes, carbon nanofibers, carbon nanowires, and a combination thereof.

The catalyst metals may include at least one selected from the group consisting of platinum (Pt), palladium (Pd), ruthenium (Ru), iridium (Ir), gold (Au), silver (Ag), chromium (Cr), manganese (Mn), iron (Fe), and cobalt (Co), nickel (Ni), copper (Cu), molybdenum (Mo), yttrium (Y), and a combination thereof.

The binder is a component for imparting adhesive strength between the catalysts. The binder is not particularly limited, and may be, for example, a perfluorinated sulfonic acid-based polymer. In addition, the binder may be the same as or different from the ionomer.

The solvent may include a mixture in which an aqueous solvent is mixed with an organic solvent in a mass ratio ranging from 5:5 to 8:2. When a content of the aqueous solvent is high, viscosity of the electrode slurry is increased, and thus it may be difficult to form a shape of the electrode layer. When a content of the organic solvent is high, the electrolyte membrane 20 may be excessively expanded due to the solvent.

The aqueous solvent may contain water. The organic solvent may contain at least one selected from the group consisting of methanol, ethanol, 1-propanol, 1-butanol, 1-pentanol, and a combination thereof.

A method of applying the electrode slurry is not particularly limited, and the electrode slurry may be applied using, for example, a bar coater, a squeegee, a blade, or the like.

Figure 8:
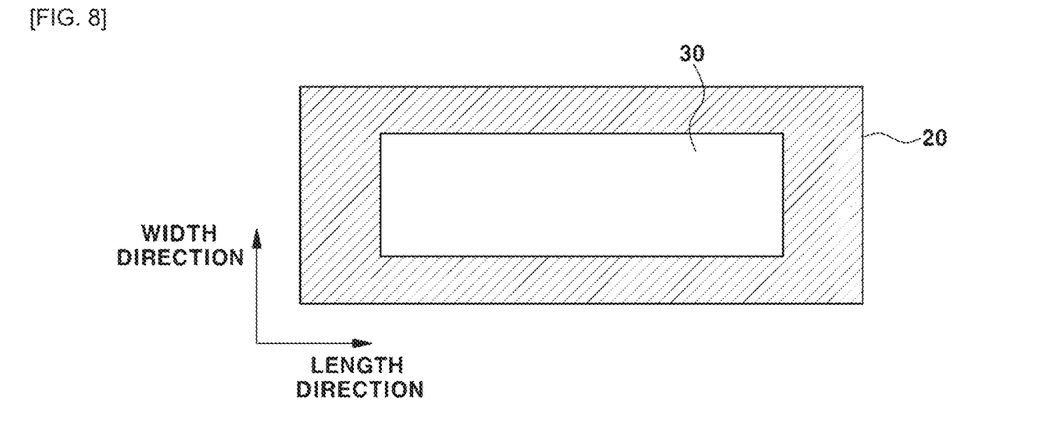
FIG. 8 is a plan view illustrating a structure according to the present disclosure.

The electrode slurry is applied and then dried so that the structure 40 may be manufactured. FIG. 8 is a plan view of the structure 40. Referring to FIG. 8, the electrode layer 30 may be formed to have a surface area that is smaller than a surface area of the electrolyte membrane 20 based on a length direction and a width direction.

As described above, since the electrolyte membrane 20 is bonded to the base material 10 with a predetermined level of delamination strength, even when the electrode layer 30 is directly formed on the electrolyte membrane 20, the electrolyte membrane 20 is not significantly expanded so that wrinkles or cracks are not generated in the electrode layer 30.

Figure 9:
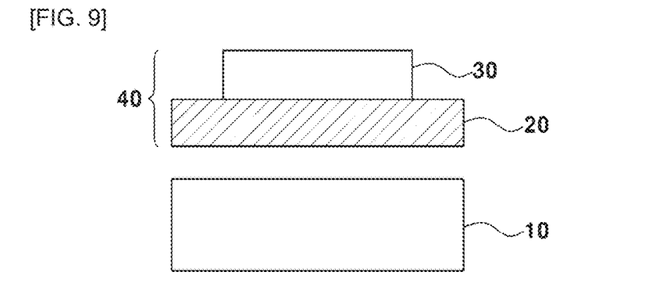
FIG. 9 is a diagram illustrating a state in which the structure is delaminated from the base material according to the present disclosure.

Next, as shown in FIG. 9, the structure 40 may be delaminated from the base material 10 (S30).

The structure 40 may be delaminated from the base material 10 without a separate treatment, or the structure 40 and the base material 10 are exposed to a high temperature and high humidity condition and then the structure 40 may be laminated.

When the structure 40 and the base material 10 are exposed to the high temperature and high humidity condition, since an expansion rate of the base material 10 is different from an expansion rate of the electrolyte membrane 20, a gap is formed between the base material 10 and the electrolyte membrane 20 such that the structure 40 may be more easily delaminated.

Specifically, in a condition in which a temperature ranges from 30° C. to 100° C. and relative humidity (RH) ranges from 50% to 100%, the structure 40 is exposed for three seconds or more and then delaminated from the base material 10.

The above operation may be performed by putting the structure 40 and the base material 10 into a chamber satisfying the above condition.

Figure 10:
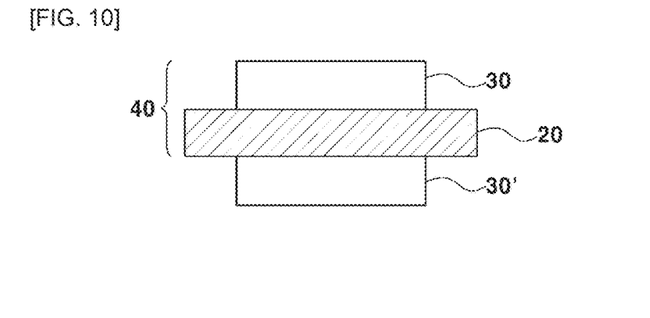
FIG. 10 is a diagram illustrating an MEA manufactured according to the present disclosure.

Thereafter, as shown in FIG. 10, an electrode layer 30' may be formed on the other surface of the electrolyte membrane 20 to obtain an MEA. Another electrode layer 30' may be formed by transferring the electrode layer 30' formed on the release paper to the other surface of the electrolyte membrane 20.

Here, when one electrode layer 30 is a cathode, the electrode layer 30' may be an anode. Conversely, when the one electrode layer 30 is an anode, the electrode layer 30' may be a cathode.

The MEA obtained as described above may be heat-treated (S50). A condition of the heat treatment is not particularly limited, and the heat treatment may be performed in a condition in which the electrode layers 30 and 30' and the electrolyte membrane 20 are not degraded.

Hereinafter, the present disclosure will be described in more detail with reference to specific examples. However, these examples are for illustrative purposes only, and the scope of the present disclosure is not limited thereto.

Example 1 and Comparative Examples 1 and 2

First, an ionomer was applied on a base material to form an electrolyte membrane. A PET film was used as the base material. A short side chain ionomer was used as the ionomer. Specifically, perfluorosulfonic acid (PFSA), which is a perfluorinated sulfonic acid-based polymer expressed by Formula 2 below, was used. An EW of the ionomer was 720 g/mol. Delamination strength between the base material and the electrolyte membrane was adjusted as shown in Table 1 below.

[Formula 2]

wherein, m is 4.2, n is 1, x is 0, and y is 2.

Next, a catalyst, a binder, and a solvent were mixed to prepare an electrode slurry. A catalyst in which platinum was deposited on a carbon support was used as the catalyst, and the binder which is the same as the ionomer was used. A mixture in which water and 1-propanol were mixed in a mass ratio shown in Table 1 below was used as the solvent.

TABLE 1

| Items | Delamination strength [gf/mm] | Mixing ratio of solvent [mass ratio]; Water:1-propanol |
|---|---|---|
| Example 1 | 7.32 | 7:3 |
| Comparative Example 1 | 0.16 | 7:3 |
| Comparative Example 2 | 7.32 | 9:1 |

Figure 11A:
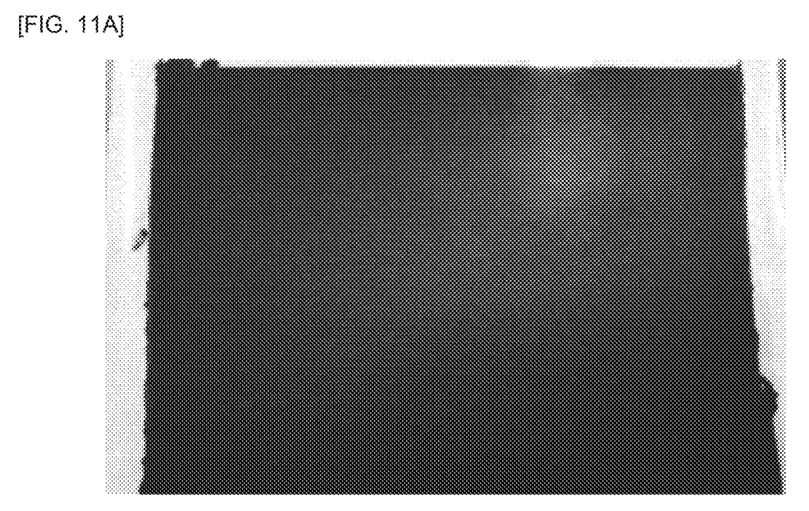
FIG. 11A is a photograph showing an electrode layer manufactured according to Example 1 of the present disclosure.
Figure 11B:
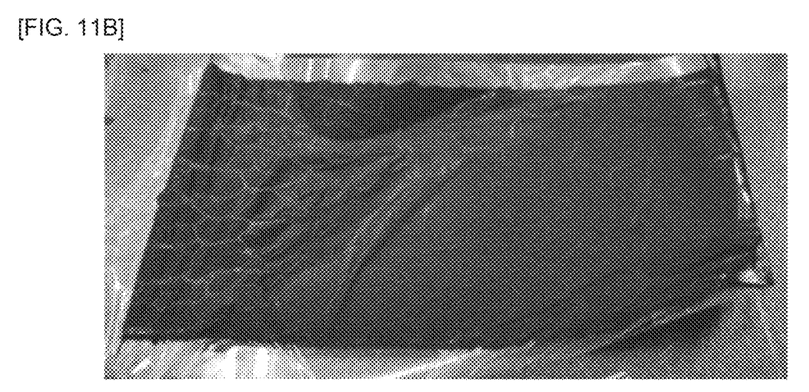
FIG. 11B is a photograph showing an electrode layer manufactured according to Comparative Example 1.
Figure 11C:
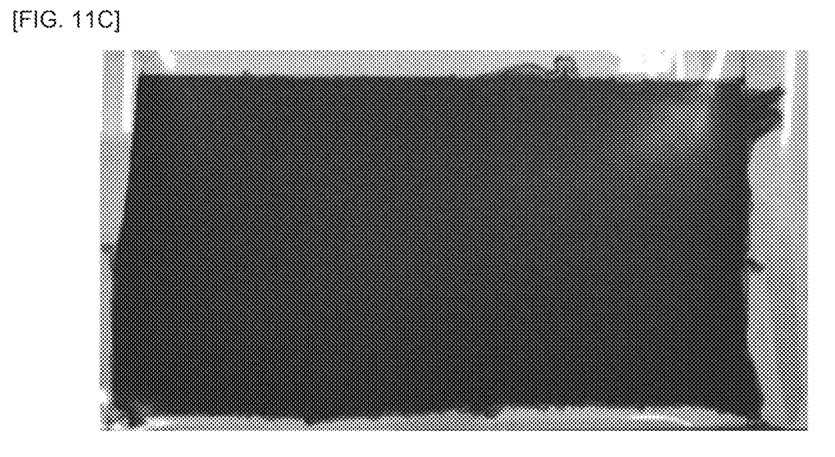
FIG. 11C is a photograph showing an electrode layer manufactured according to Comparative Example 2.

The electrode slurry was applied to the electrolyte membrane and dried to form an electrode layer. The results are shown in FIGS. 11A to 11C. FIG. 11A is an electrode layer manufactured according to Example 1, and FIGS. 11B and 11C are electrode layers manufactured according to Comparative Examples 1 and 2, respectively.

Referring to FIG. 11A, it can be seen that, in the electrode layer of Example 1 according to the present disclosure, wrinkles, cracks, and the like were not generated, and a shape of the electrode layer was neatly maintained.

Referring to FIG. 11B, it can be seen that, in Comparative Example 1 in which delamination strength is low, wrinkles and cracks were generated in the electrode layer. Referring to FIG. 11C, it can be seen that, in Comparative Example 2 in which a mass ratio of water which is an aqueous solvent was high, cracks were not generated, but a shape of the electrode layer, specifically, a shape of a boundary portion of the electrode layer was not maintained.

Example 2 and Comparative Example 3

First, an ionomer was applied on a base material to form an electrolyte membrane. A PI film was used as the base material. A medium side chain ionomer was used as the ionomer. Specifically, PFSA, which is a perfluorinated sulfonic acid-based polymer expressed by Formula 3 below, was used. An EW of the ionomer was 725 g/mol.

[Formula 3]

wherein m is 3.6, n is 1, x is 0, and y is 4.

Figure 12:
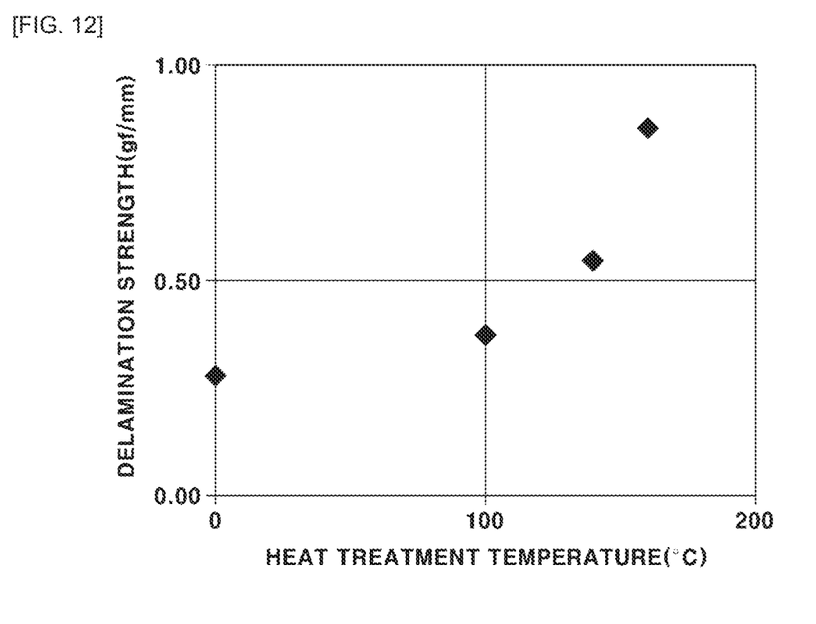
FIG. 12 is graph showing a result of measuring delamination strength between a base material and an electrolyte membrane according to a temperature of heat treatment with respect to the base material and the electrolyte membrane in Example 2 of the present disclosure.

Delamination strength between the base material and the electrolyte membrane was adjusted to about 0.84 gf/mm. Specifically, the delamination strength was adjusted by heat-treating the base material and the electrolyte membrane at a temperature of about 160° C. FIG. 12 shows results of measuring delamination strengths between the base material and the electrolyte membrane when the base material and the electrolyte membrane were heat-treated in a convection oven at temperatures of 100° C., 140° C., and 160° C. for about thirty minutes, respectively. Referring to FIG. 12, it can be seen that the delamination strength reached about 0.84 gf/mm when the heat treatment was performed at a temperature of 160° C.

Next, a catalyst, a binder, and a solvent were mixed to prepare an electrode slurry. A catalyst in which platinum was deposited on a carbon support was used as the catalyst, and the binder which is the same as the ionomer was used. A mixture in which water and 1-propanol were mixed in a mass ratio of 7:3 was used as the solvent.

The electrode slurry was applied to the electrolyte membrane and dried to form an electrode layer. A structure including the electrolyte membrane and the electrode layer was delaminated from the base material, and another electrode layer was transferred to and formed on the other surface of the electrolyte membrane through a decal method. An MEA which was obtained as described above was set as Example 2.

In Comparative Example 3, the MEA was manufactured of the same material as in Example 2, and both of a pair of the electrode layers were transferred to and formed on the electrolyte membrane through the decal method.

Figure 13:
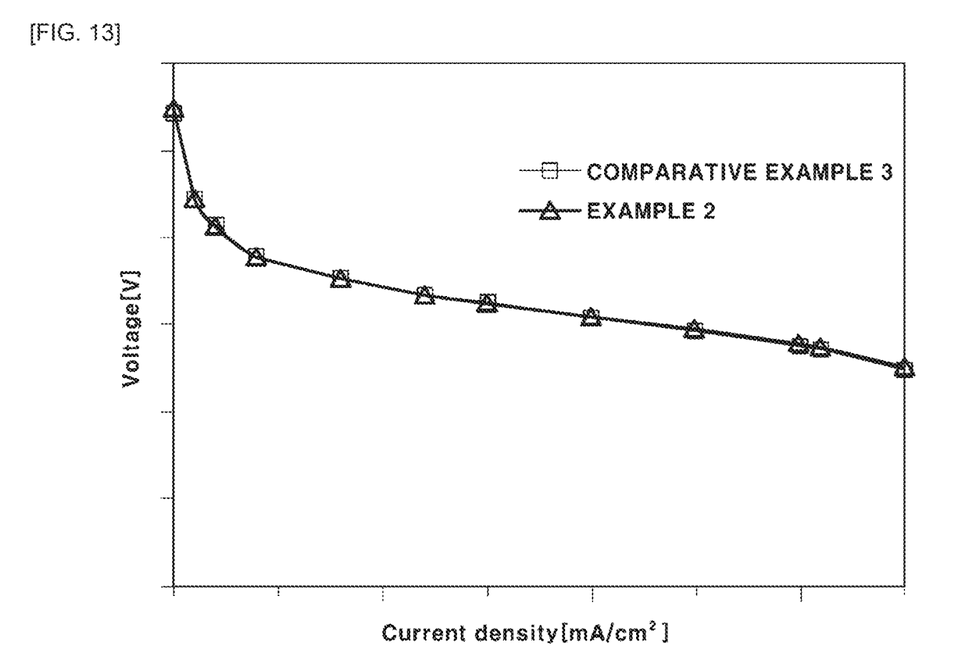
FIG. 13 is a graph showing a result of measuring battery performance of MEAs of Example 2 of the present disclosure and Comparative Example 3.

Battery performances of the MEAs according to Example 2 and Comparative Example 3 were measured. The results are shown in FIG. 13. Referring to FIG. 13, it can be seen that Example 2 and Comparative Example 3 exhibited the same level of battery performance.

Example 3

First, an ionomer was applied on a base material to form an electrolyte membrane. A PET film was used as the base material. A long side chain ionomer was used as the ionomer. Specifically, PFSA, which is a perfluorinated sulfonic acid-based polymer expressed by Formula 4 below, was used. An EW of the ionomer was 740 g/mol. Delamination strength between the base material and the electrolyte membrane was adjusted to about 0.28 gf/mm.

[Formula 4]

wherein m is 3, n is 1, x is 1, and y is 2.

Next, a catalyst, a binder, and a solvent were mixed to prepare an electrode slurry. A catalyst in which platinum was deposited on a carbon support was used as the catalyst, and the binder which is the same as the ionomer was used. A mixture in which water and 1-propanol were mixed in a mass ratio of 7:3 was used as the solvent.

Figure 14:
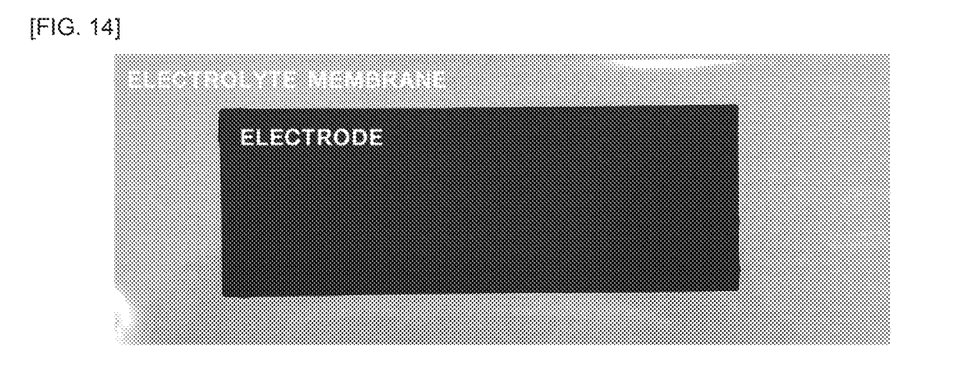
FIG. 14 is a photograph showing an electrode layer manufactured according to Example 3 of the present disclosure.

The electrode slurry was applied to the electrolyte membrane and dried to form an electrode layer. The results are shown in FIG. 14. Referring to FIG. 14, it can be seen that, in the electrode layer of Example 3 according to the present disclosure, wrinkles, cracks, and the like were not generated, and a shape of the electrode layer was neatly maintained.

In accordance with the present disclosure, in manufacturing a membrane-electrode assembly (MEA) by a direct coating method, since a dimensional change of an electrolyte membrane is small, it is possible to prevent generation of cracks and the like in an electrode layer.

The effects of the present disclosure are not limited to the above-described effects. It should be understood that the effects of the present disclosure include all effects which can be inferred from the above description.

Although the experimental examples and the embodiments of the present disclosure have been described in detail, the scope of the prevent disclosure is not limited to these experimental examples and embodiments, and various modifications and improvements devised by those skilled in the art using the fundamental concept of the present disclosure, which is defined by the appended claims, further fall within the scope of the present disclosure.

What is claimed is:
1. A method of manufacturing a membrane-electrode assembly, the method comprising:
   forming an electrolyte membrane containing an ionomer on a base material;
   applying an electrode slurry, which contains a catalyst, a binder, and a solvent, to a first surface of the electrolyte membrane to form a structure including the electrolyte membrane and an electrode layer laminated on the first surface of the electrolyte membrane; and
   delaminating the structure from the base material,
   wherein the ionomer contains a perfluorinated sulfonic acid-based polymer expressed by Formula 1 below:

[Formula 1]

wherein m is 4.2, n is 1, x is 0, and y is 2,
the method further comprising, after the forming the electrolyte membrane:
   performing heat treatment on a resultant of the electrolyte membrane and the base material; and
   adjusting delamination strength between the base material and the electrolyte membrane to 7.32 gf/mm or more and 10 gf/mm or less,
wherein the heat treatment is performed in a condition in which a temperature ranges from 100° C. to 160° C.,
wherein the solvent includes a mixture in which an aqueous solvent is mixed with an organic solvent in a mass ratio ranging from 5:5 to 8:2, wherein, in a condition in which a temperature ranges from 30° C. to 100° C. and relative humidity (RH) ranges from 50% to 100%, the structure is exposed for three seconds or more and delaminated from the base material.

2. The method of claim 1, wherein the base material includes at least one release paper selected from the group consisting of polyimide (PI), polyethylene terephthalate (PET), polyethylene naphthalate (PEN), polytetrafluoroethylene (PTFE), and a combination thereof.

3. The method of claim 1, wherein the electrolyte membrane includes a reinforcement layer and an ion transport layer that is provided on at least one surface of the reinforcement layer, and wherein the ion transport layer contains the ionomer.

4. The method of claim 1, wherein the electrode slurry is applied and then dried to form the structure.

5. The method of claim 1, wherein a surface area of the electrode layer is smaller than that of the electrolyte membrane.

6. The method of claim 1, further comprising forming a second electrode layer on a second surface of the electrolyte membrane included in the delaminated structure to form the membrane-electrode assembly (MEA).

7. The method of claim 6, further comprising performing heat treatment on the MEA.

* * * * *